(12) United States Patent
Nakanii et al.

(10) Patent No.: US 7,445,082 B2
(45) Date of Patent: Nov. 4, 2008

(54) NOISE SUPPRESSING DEVICE AND INSTALLATION STRUCTURE OF SAME

(75) Inventors: Wataru Nakanii, Tokyo (JP); Taiki Aoyama, Hadano (JP); Takeshi Kojima, Machida (JP)

(73) Assignees: Nifco Inc., Yokohama, Kanagawa (JP); Nissan Motor Co., Ltd, Yokohama, Kanagawa (JP)

( * ) Notice: Subject to any disclaimer, the term of this patent is extended or adjusted under 35 U.S.C. 154(b) by 289 days.

(21) Appl. No.: 11/402,942

(22) Filed: Apr. 13, 2006

(65) Prior Publication Data
US 2006/0237466 A1     Oct. 26, 2006

(30) Foreign Application Priority Data
Apr. 21, 2005   (JP)   ............................. 2005-123441
Dec. 15, 2005   (JP)   ............................. 2005-361315

(51) Int. Cl.
*A47B 81/06*     (2006.01)

(52) U.S. Cl. .................... 181/198; 181/233; 220/563; 220/734; 137/574

(58) Field of Classification Search ................ 181/198, 181/233; 220/734, 563; 137/574
See application file for complete search history.

(56) References Cited

U.S. PATENT DOCUMENTS

| | | | | |
|---|---|---|---|---|
| 1,616,008 | A * | 2/1927 | Stout | 220/563 |
| 2,806,622 | A * | 9/1957 | Leirer | 220/4.14 |
| 3,102,972 | A * | 9/1963 | Andresen | 361/215 |
| 3,124,120 | A * | 3/1964 | Best | 126/110 B |
| 3,294,278 | A * | 12/1966 | Madden et al. | 220/563 |
| 3,306,454 | A * | 2/1967 | Webb | 210/172.3 |
| 3,474,971 | A * | 10/1969 | Goodrich | 239/558 |
| 3,556,734 | A * | 1/1971 | Peterson | 422/171 |
| 3,701,540 | A * | 10/1972 | Pringle | 280/834 |
| 4,450,501 | A * | 5/1984 | Kobayashi | 361/284 |
| 4,512,067 | A * | 4/1985 | Kobayashi | 29/25.41 |
| 4,519,012 | A * | 5/1985 | Kobayashi | 361/284 |
| 4,844,278 | A * | 7/1989 | Freiwald et al. | 220/563 |
| 4,974,743 | A * | 12/1990 | Sasaki et al. | 220/694 |
| 5,031,795 | A * | 7/1991 | Kotera et al. | 220/563 |
| 5,273,193 | A * | 12/1993 | Murakami et al. | 222/189.06 |
| 5,777,947 | A * | 7/1998 | Ahuja | 367/1 |

(Continued)

FOREIGN PATENT DOCUMENTS

JP     03-074218     3/1991

(Continued)

*Primary Examiner*—Walter Benson
*Assistant Examiner*—Christina Russell
(74) *Attorney, Agent, or Firm*—Manababu Kanesaka (57) ABSTRACT

A noise suppressing device attachable to a wall within a liquid container can lessen and absorb noise generated by a liquid as it moves within the container. The device has a main plate body with an upper plate surface and a lower plate surface, through holes extending through the upper and lower plate surfaces for permitting flow of the liquid from one side of the main plate body to the other side of the main plate body, and projections formed on the main plate body. Each projection has a base and a tip, and is tapered from the base to the tip. The noise suppressing device also has an attachment device for attaching the main plate body to the container wall. The device is easy to manufacture and install, and effectively suppresses liquid noise.

13 Claims, 11 Drawing Sheets

U.S. PATENT DOCUMENTS

| | | | |
|---|---|---|---|
| 5,850,933 A * | 12/1998 | Pazik | 220/563 |
| 6,032,347 A * | 3/2000 | Behr et al. | 29/419.1 |
| 6,220,287 B1 * | 4/2001 | Wolf | 137/574 |
| 6,382,531 B1 * | 5/2002 | Tracy | 239/548 |
| 6,408,979 B1 * | 6/2002 | Forbes et al. | 181/198 |
| 6,499,620 B1 * | 12/2002 | Boguet et al. | 220/563 |
| 6,568,556 B1 * | 5/2003 | Kahler et al. | 220/563 |
| 6,736,282 B2 * | 5/2004 | Krogull | 220/563 |
| 6,739,527 B1 * | 5/2004 | Chung | 239/558 |
| 6,782,745 B1 * | 8/2004 | Zurek et al. | 73/204.22 |
| 6,786,350 B2 * | 9/2004 | Bauer | 220/563 |
| 6,966,401 B2 * | 11/2005 | Kojima | 181/233 |
| 7,073,534 B2 * | 7/2006 | Sawchuk et al. | 138/39 |
| 2002/0113694 A1 * | 8/2002 | Muirhead | 340/450 |
| 2003/0015537 A1 * | 1/2003 | Konja | 220/563 |
| 2004/0060770 A1 * | 4/2004 | Kojima | 181/233 |

FOREIGN PATENT DOCUMENTS

| | | |
|---|---|---|
| JP | 2004-122902 | 4/2004 |
| JP | 2006116987 A * | 5/2006 |
| JP | 2006248367 A * | 9/2006 |
| WO | WO 2007099691 A1 * | 9/2007 |

* cited by examiner

NOISE SUPPRESSING DEVICE AND INSTALLATION STRUCTURE OF SAME

BACKGROUND OF THE INVENTION AND RELATED ART STATEMENT

The present invention relates to a noise suppressing device suited for installation within a container, such as a fuel tank, to lessen and absorb the sloshing sound or the like of the liquid contained therein, i.e., to disperse or dampen the energy of the wave action.

Fuel tanks are provided with noise suppressing devices of various structures as shown in Japanese Utility Model Publication (KOKOKU) No. H06-6986, Japanese Patent No. 2719002, and Japanese Patent Publication (KOKAI) No. 2004-122902.

The structure disclosed in Japanese Utility Model Publication No. H06-6986 employs several sheets of mesh material that are stacked in layers at intervals by interposing raised ribs between the mesh material, and disposed and attached along the fuel tank's inner wall using brackets and the like. The operation is characterized such that when the fuel in the tank is sloshed around or moved by vibration or the like, the fuel within the tank passes through the mesh, and the wave action is dispersed, lessened or absorbed while the liquid passes through the intervals between the mesh materials.

The structure disclosed in Japanese Patent No. 2719002 has a spongy baffle part adhered to a section of the mounting bracket. In other words, the baffle part is a mass of entangled lint-like material of a predetermined size formed by extruding a molten resin as fine linear material through a number of nozzles onto a corresponding section of the bracket. The operation is characterized such that when the fuel in the tank is sloshed around or moved by vibration or the like, the liquid surge is dispersed, lessened or absorbed while the fuel passes through the baffle part having numerous small spaces and maze-like intervals.

The structure disclosed in Japanese Patent Publication No. 2004-122902 has a mesh material formed as a flat bag, numerous small pieces contained within the mesh bag, and a frame that holds the side edges of the bag. The operation is characterized by the synergy between the effect of lessening or absorbing the liquid surge of the fuel achieved by the two surfaces of the flat mesh bag and the effect of lessening or absorbing the liquid surge achieved through the spaces created by the small pieces in the bag as well as the numerous small pieces themselves.

The conventional devices described above have the following problems. The structure disclosed in Japanese Utility Model Publication No. H06-6986 is difficult to handle, as the mesh material is stacked in layers. The installation of the device in a fuel tank is time consuming, and the noise suppressing effect tends to vary depending on the installation conditions.

The structure disclosed in Japanese Patent No. 2719002 has low forming efficiency, as the spongy baffle part is created while a molten resin is extruded from nozzles. In addition, the noise suppressing effect tends to vary depending on the manner in which the resin is extruded through nozzles or the manner in which the resin hardens.

The structure disclosed in Japanese Patent Publication No. 2004-122902 can be more easily installed in a fuel tank than the device disclosed in Japanese Utility Model Publication No. H06-6986, and can more effectively stabilize the noise suppressing characteristics than the device disclosed in Japanese Patent No. 2719002. However, forming a mesh bag, storing small pieces in the bag, and disposing a frame makes it difficult to reduce manufacturing cost.

Accordingly, it is an object of the present invention to provide a noise suppressing device that solves all of the problems described above, and that has excellent installation and mass production qualities, and stable noise suppressing characteristics.

Further objects and advantages of the invention will be apparent from the following description of the invention.

SUMMARY OF THE INVENTION

In order to achieve the objectives described above, the present inventors devised the device structures explained below.

According to a first embodiment of the invention, a noise suppressing device is attachable within a liquid container for lessening and absorbing the noise generated by the liquid as it moves within said container (this refers to dispersing or dampening the energy of the liquid surge). The device has a main plate body provided with through holes extending through the upper and lower surfaces of the plate for permitting the flow of the liquid from one side to the other and projections formed on the plate, and a means for installing said main plate body to an installation wall within said container, and tapering said projections from the base to the tip thereof.

In one embodiment of the noise suppressing device attachable within a liquid container for lessening and absorbing the noise created by the liquid as it moves within said container, the device has a plurality of plates with through holes extending through the upper and lower surfaces of the plate for permitting the flow of the liquid from one side to the other, with the plates stacked at intervals.

It is preferable to embody the invention described above as specified by the following description.

The device comprises disposing the through holes between the projections.

The device comprises setting the through holes of each plate so that the substantial hole area for permitting the passage of the liquid varies from plate to plate.

The device comprises setting the through holes of each plate so that the substantial hole area increases as the distance from the first plate increases.

Moreover, the device comprises providing the first plate with the projections tapering from the base to the tip thereof, and varying the substantial hole area by inserting the projections into the plates other than the first plate.

The device comprises shifting the positions of the through holes of the first plate from those of the through holes of the plate most distant from the first plate.

Moreover, the device is provided with a tubular part disposed on the first plate, a frame part disposed on the plates other than the first plate for inserting the tubular part, and a substantially tubular connector to be inserted from the top of the tubular part and locked therein via the engagement between a flexible tab and a locking hole.

The installation structure for securely attaching the noise suppressing device to an installation wall of a container includes a stud, which has a stem and a plurality of flexible locking wings axially disposed along the stem at substantially regular intervals and is preinstalled to the installation wall. The device is pushed against the installation wall while inserting the stud through the tubular part of the first plate close to the installation wall and into the connector, and engaging one of the flexible locking wings located at a given height with the engaging piece projecting within the connector.

The installation structure for securely attaching the noise suppressing device to an installation wall of a container includes installing the first plate so that the projections protrude from the plate surface not opposing the installation wall (i.e., of the two surfaces of the first plate, the surface that is not facing the installation wall).

The noise suppressing device has a means for installing the device, and includes a main plate body that is provided with through holes and projections. Thus, it is simple and easy to handle. The device is capable of efficiently absorbing the wave action of a liquid, such as fuel, as designed in accordance with the shape and size of the container by eliminating variations in operational characteristics easily produced among products, and utilizing the number and size of the projections and through holes to lessen and absorb the liquid surge.

The noise suppressing device is capable of efficiently absorbing the wave action of a liquid, such as fuel, as designed in accordance with the shape and size of the container by utilizing the intervals set between plates and the number of such intervals provided in proportion to the number of plates to lessen and absorb the liquid surge, as well as utilizing the number and size of the projections and through holes to lessen and absorb the liquid surge. In other words, the present invention is excellent in terms of formability and handling qualities because through holes are created in each plate, for example. The device is particularly suited for achieving the optimal shape which corresponds to the shape of a container, and is capable of eliminating variations in operational characteristics that occur among products.

According to one aspect of the invention, the noise suppressing device sets the through holes of each plate so that the substantial hole area varies from plate to plate, and thus widely varies the channels for a liquid, such as fuel, to pass through in accordance with the hole area variations. The wave action, therefore, can be efficiently absorbed in accordance with the varying channels.

According to another aspect, the noise suppressing device enables a cost-effective implementation of the device by preparing, for example, two types of plates consisting of the first plate with projections, and plates other than that.

According to another aspect of the noise suppressing device, shifting the positions of the through holes of the first plate from those of the through holes of the plate most distant from said first plate, for example, can widely vary the channels for a liquid, such as fuel, to pass through in accordance with the displacement of the hole positions, and thus allow for more efficient absorption of the liquid surge.

According to another aspect of the invention, two types of plates consisting of the first plate with a tubular part, and other plates with frames, for example, are prepared to constitute a stack structure. The plates can be integrated easily with one-touch operation, with spacing maintained therebetween, through the insertion of a connector.

In the installation structure, the noise suppressing device can be installed by pushing the device against the stud that is preinstalled to the installation wall of a container. According to one aspect of the invention, the projections are formed to project from the installation wall side, and thus allow for efficient absorption of the wave action of a liquid, such as fuel.

When the operation involving the installation structure cannot be performed visually, it is preferable to provide guide ribs disposed on the outer surface of the first plate to guide the positioning of the stud to be inserted into the plate's tubular part and the connector.

DETAILED DESCRIPTION OF THE PREFERRED EMBODIMENTS

Figure 1A:
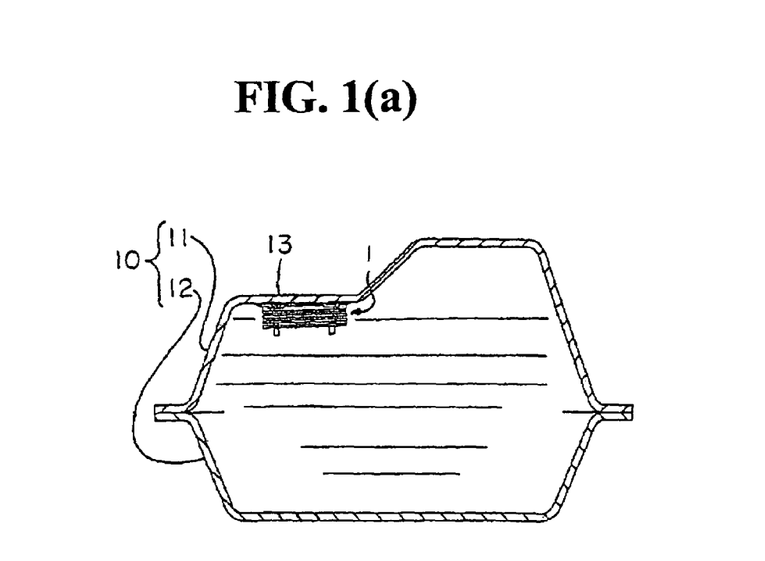
FIGS. 1(a) and 1(b) are schematic illustrations of one embodiment of a noise suppressing device shown in use, and in general appearance, respectively.
Figure 1B:
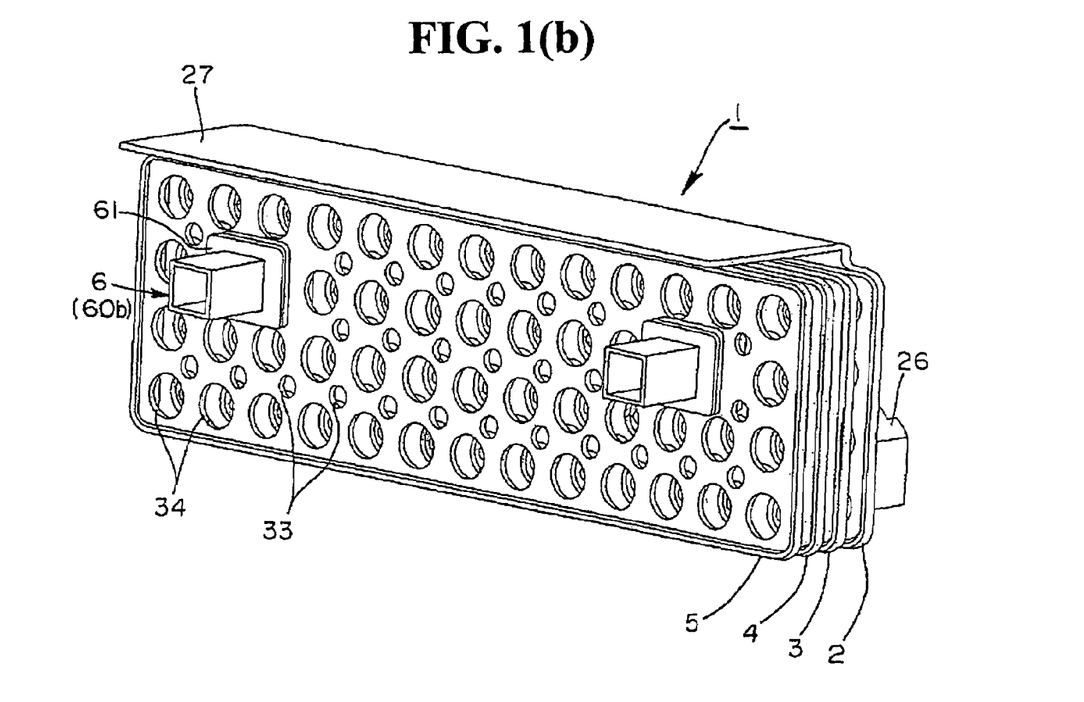
Figure 2:
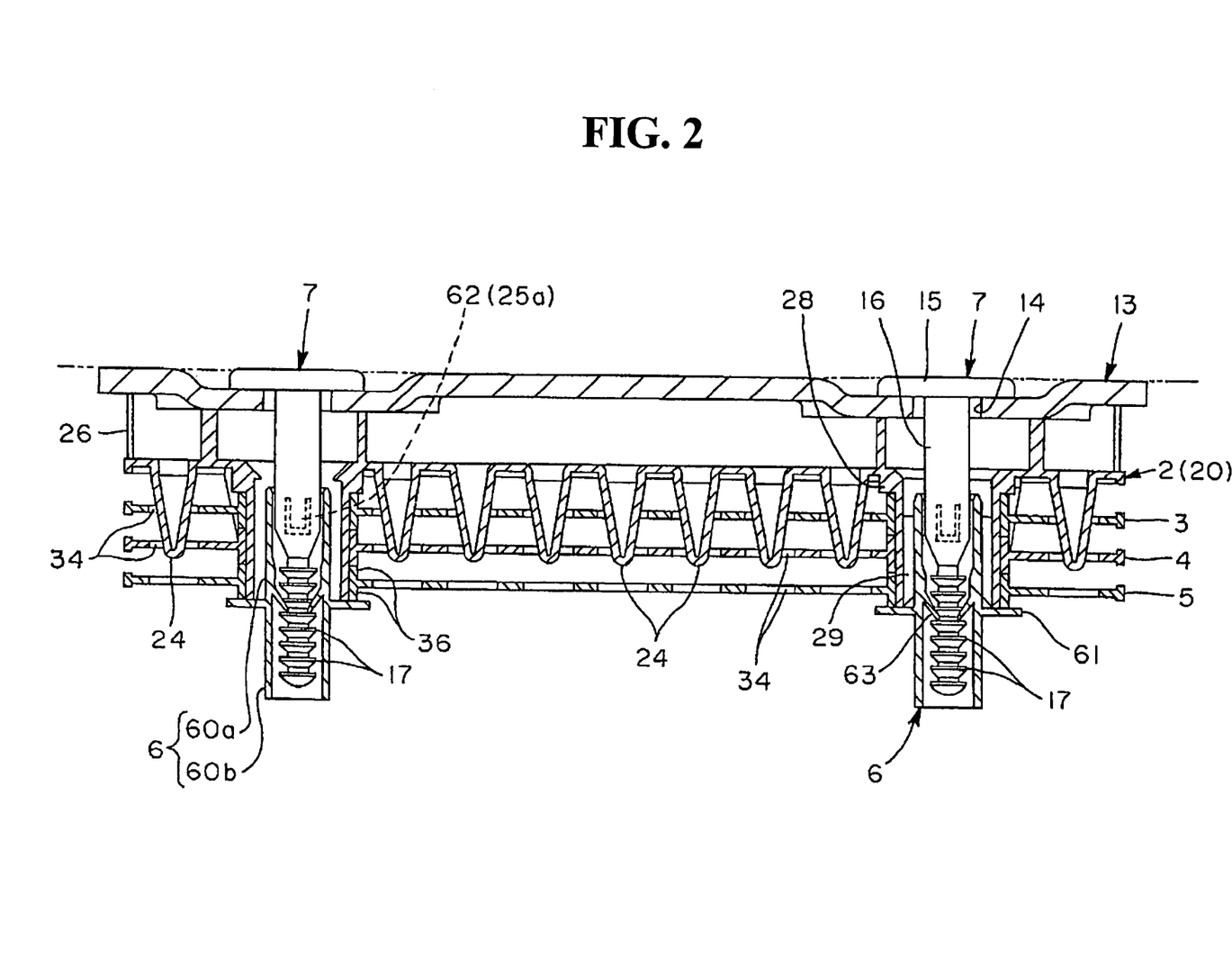
FIG. 2 is an enlarged cross section of the noise suppressing device in FIG. 1(b).
Figure 3A:
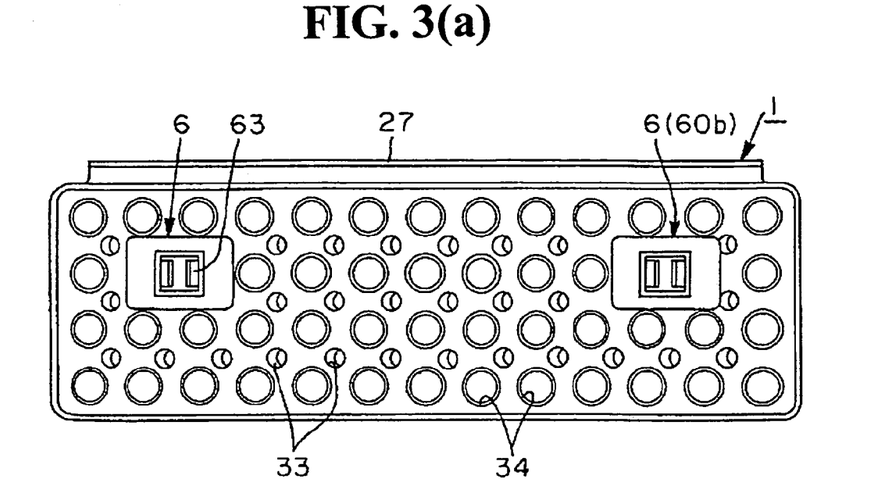
FIGS. 3(a)-3(c) are top, front, and bottom views, respectively, of the noise suppressing device.
Figure 3B:
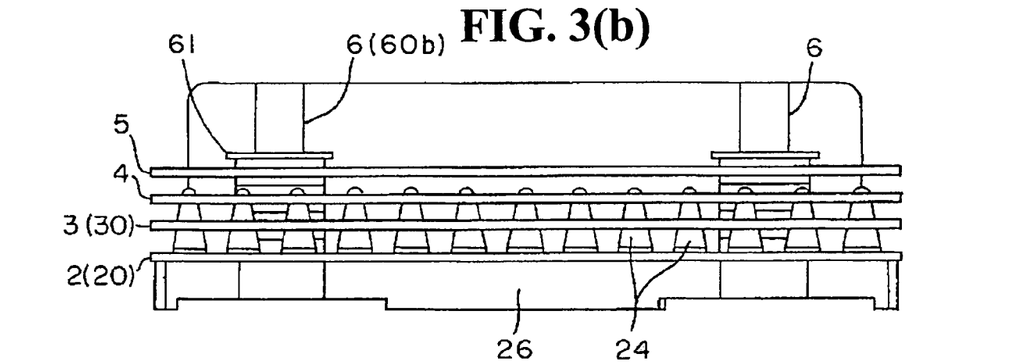
Figure 3C:
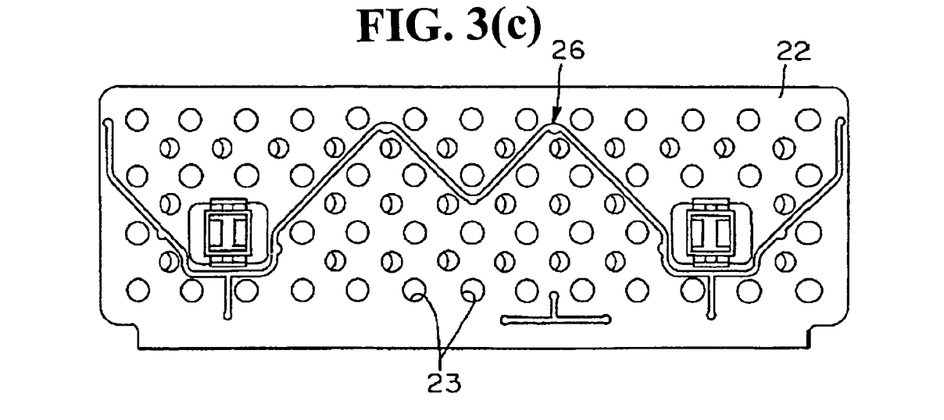
Figure 4:
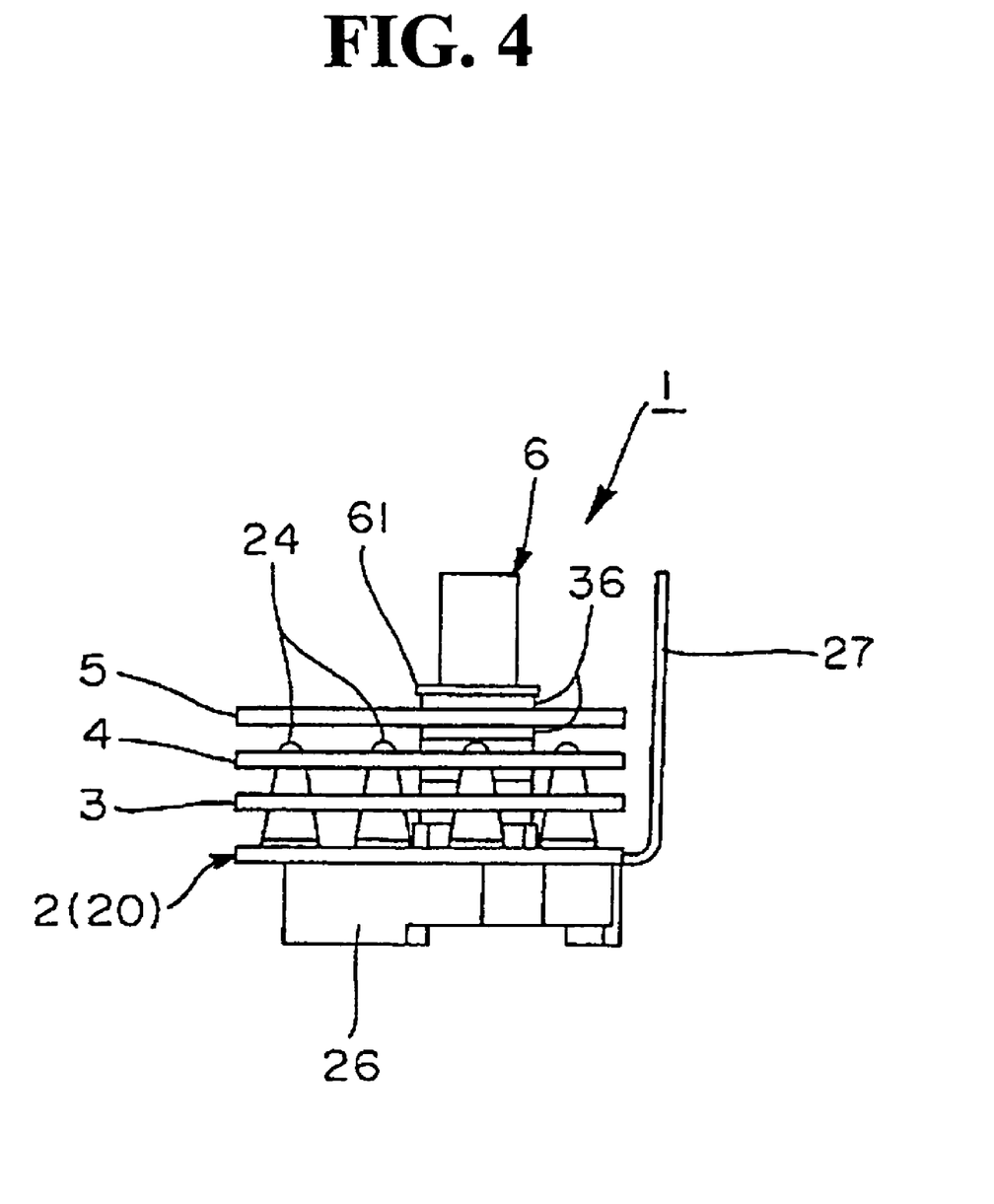
FIG. 4 is a left side view of the noise suppressing device in FIGS. 3(a)-3(c).
Figure 5A:
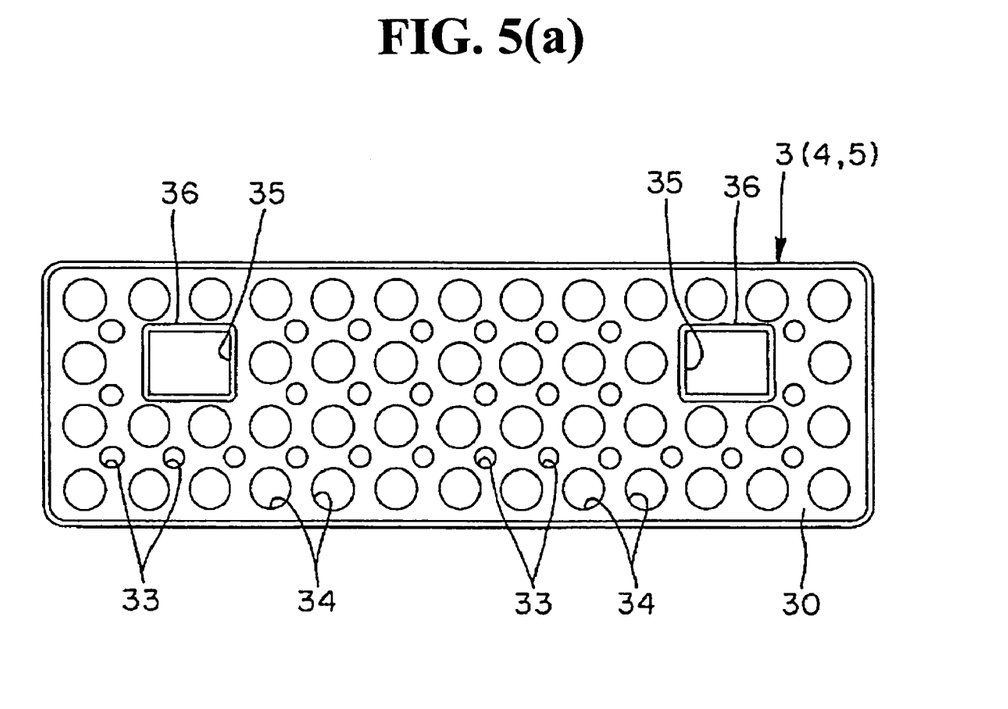
FIGS. 5(a) and 5(b) are top and front views, respectively, of one plate constituting the above noise suppressing device.
Figure 5B:
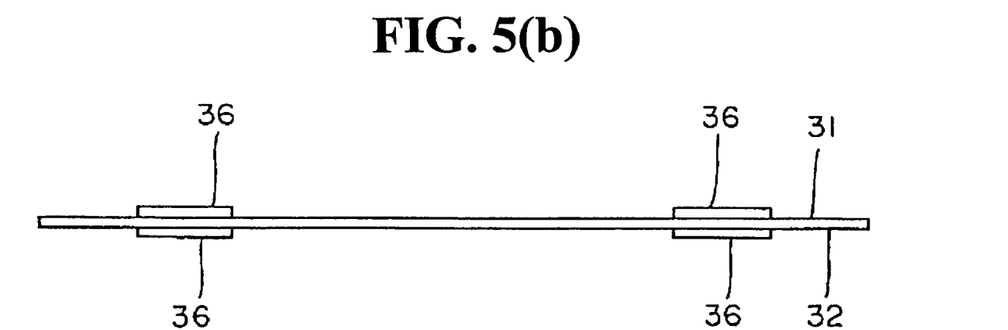
Figure 9A:
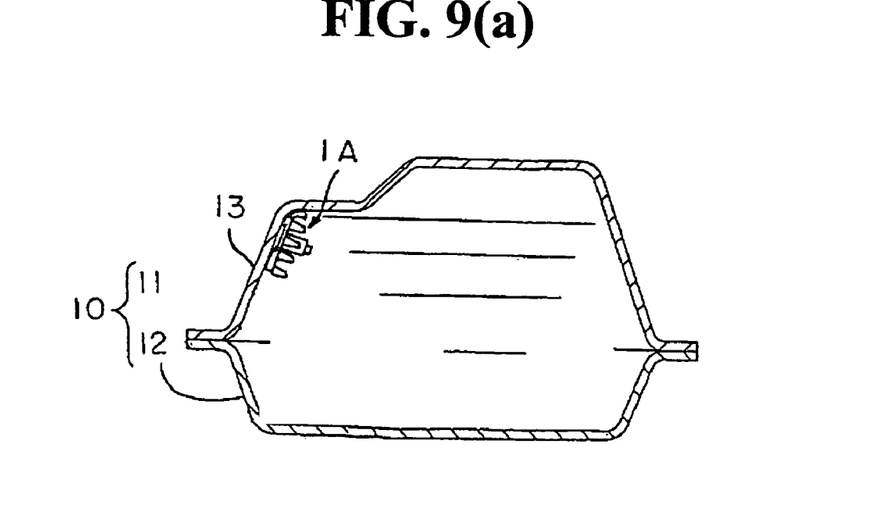
FIGS. 9(a) and 9(b) are schematic illustrations of a simplified, first variation of the above-described noise suppressing device shown in the condition of use, and in general appearance, respectively, in correspondence with FIGS. 1(a) and 1(b).
Figure 9B:
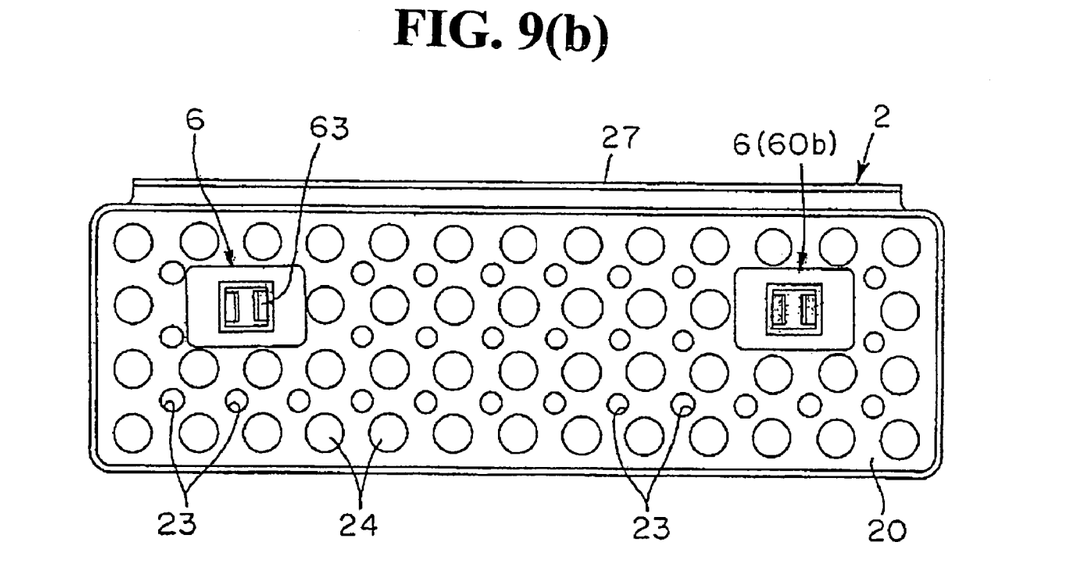
Figure 10:
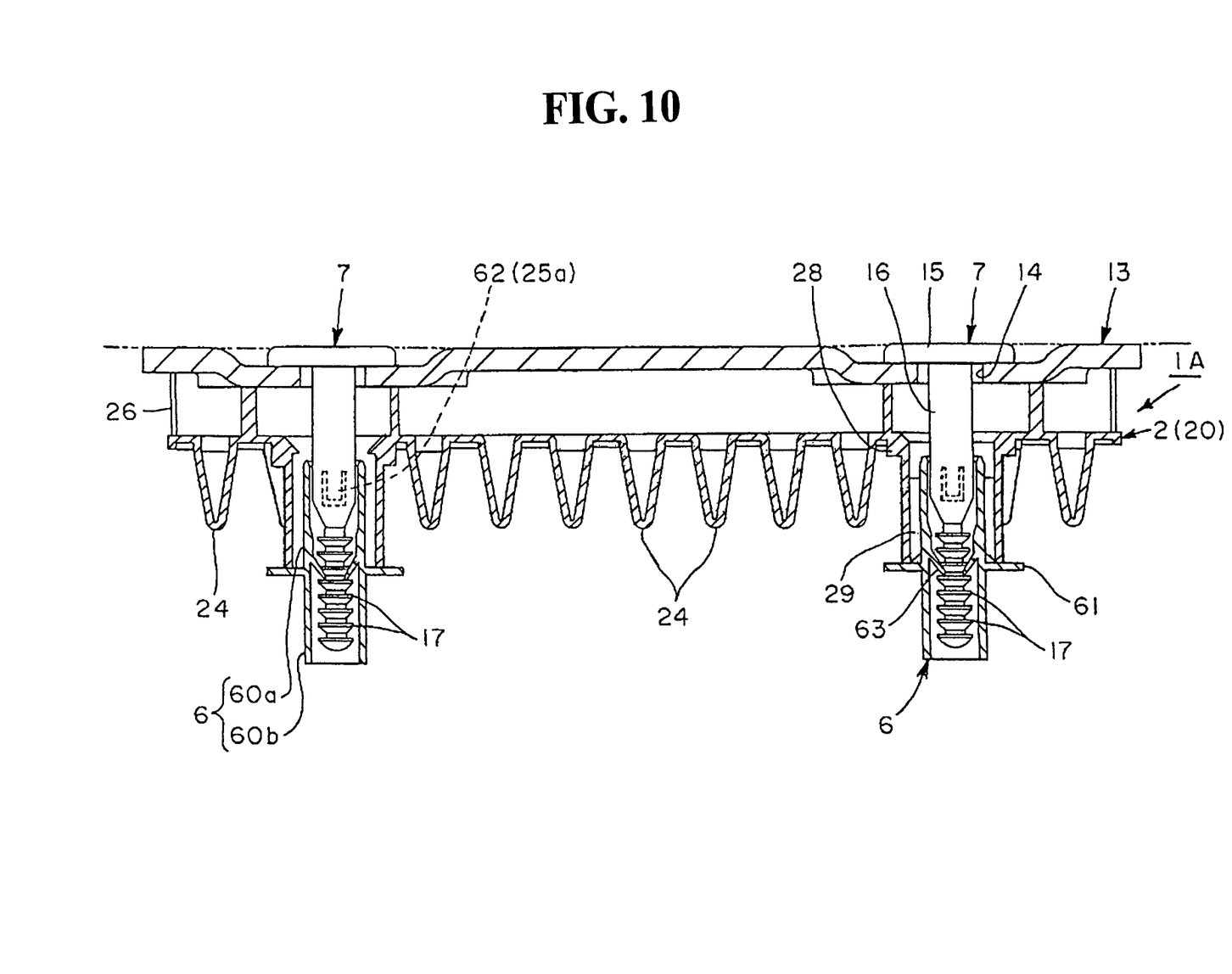
FIG. 10 is an enlarged cross section of the first variation of the noise suppressing device shown in correspondence with FIG. 2.
Figure 11A:
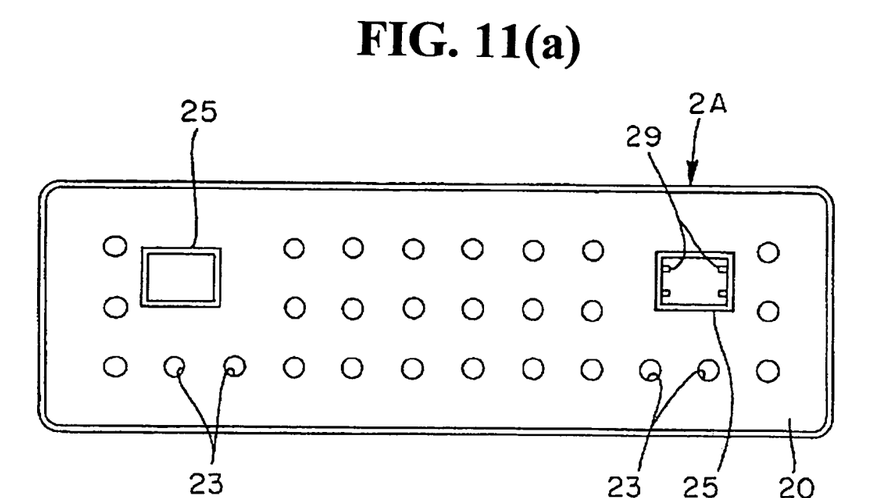
FIGS. 11(a)-11(c) are top views of the individual plates constituting a second variation of the noise suppressing device.
Figure 11B:
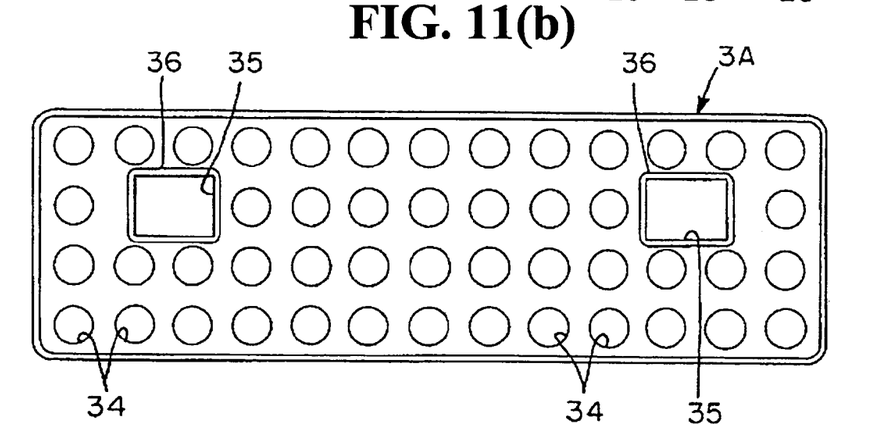
Figure 11C:
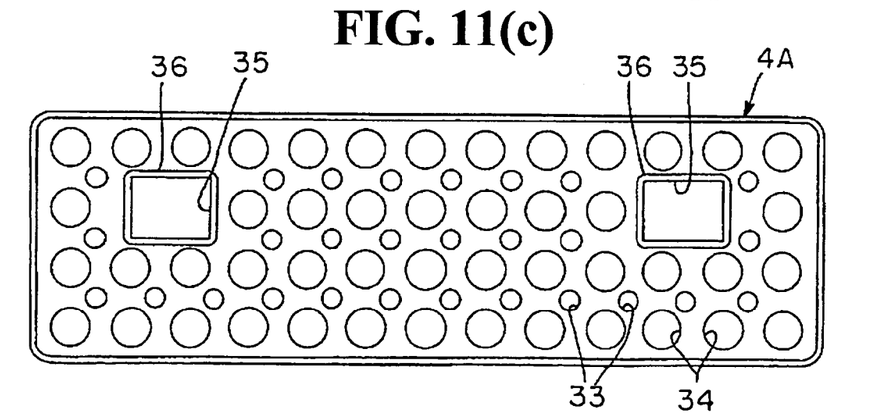

Embodiments of the noise suppressing device of the present invention will be explained with reference to the drawings. FIG. 1(a) is an illustration of a noise suppressing device while in use, and FIG. 1(b) is an illustration of the appearance thereof. FIG. 2 is a schematic, enlarged cross section of the noise suppressing device. FIGS. 3(a)-3(c) and 4 show the noise suppressing device in the state prior to installation. FIGS. 5(a) and 5(b) illustrate a plate constituting the noise suppressing device, FIGS. 6(a)-6(c) and 7(a)-7(b) illustrate another plate, and FIGS. 8(a)-8(d) illustrate a connector. FIGS. 9(a) and 9(b) and 10 show, in correspondence with FIGS. 1(a) and 1(b) and 2, the first variation, or simplified version, of the noise suppressing device of the invention. FIGS. 11(a)-11(c) show the second variation of the noise suppressing device, in which the shape thereof is modified. In the following, the device's structure, operation, the first variation, and the second variation will be explained in detail in the order stated.

Device Structure

The noise suppressing device 1 shown in FIGS. 1(a) and 1(b) through 8(a)-8(d) is constructed by integrally stacking a plurality of plates 2-5 at intervals using connectors 6, and is to be attached by utilizing studs 7 disposed upright on the installation wall 13 within the fuel tank (container) 10 for containing fuel (liquid). Resin is used for both the plates 2-5 and connectors 6, but other materials may do as well. Although all of the plates 2-5 are rigid and substantially rectangular in shape that are resistant to deformation, the shape of the innermost plate (first plate) 2 positioned closest to the installation wall 13 differs significantly from the other plates 3-5. For convenience sake, in the explanation of these plates, the respective surfaces that oppose the installation wall 13 will be referred to as lower surfaces and the opposite surfaces will be referred to as upper surfaces. Since the plates 3-5 have the same or similar shape, plate 3 will be used as an example in the explanation.

As shown in FIG. 1 (a), the upper shell 11 and the lower shell 12 of the fuel tank 10 are integrated by means of a conventional method, such as welding the respective flange sections. On the inner side of the upper shell 11, one wall section denoted by reference number wall 13, for example, is set up as an installation wall. In the installation 13, a pair of studs 7 for installing the noise suppressing device 1 is disposed upright. Each of the pair of studs 7, as shown in FIG. 2, integrally forms a head 15, which is securely attached to the installation wall 13 by welding or the like, a stem 16, which is disposed on the head 15 and inserted from a through hole 14 of the installation wall 13, and a plurality of flexible locking wings 17 disposed axially along the stem 16 at substantially regular intervals.

The innermost plate 2, as shown in FIGS. 6(a)-6(c) and 7(a) and 7(b), integrally forms a plurality of through holes 23 that extend through the upper and lower surfaces 21 and 22 of the plate 20, numerous projections 24 and two tubular parts 25 disposed on the upper surface 21 of the plate 20, guide ribs 26 disposed on the lower surface 22 of the plate 20, and an upright wall 27 disposed so as to stand forward from the front or rear edge of the plate 20.

Figure 6A:
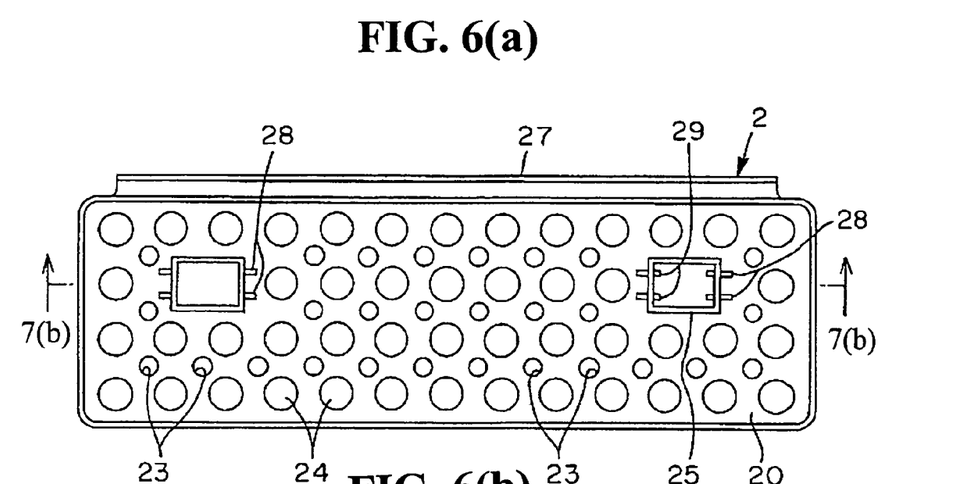
FIGS. 6(a)-6(c) are top, front, and bottom views, respectively, of another plate constituting the above-described noise suppressing device.
Figure 6B:
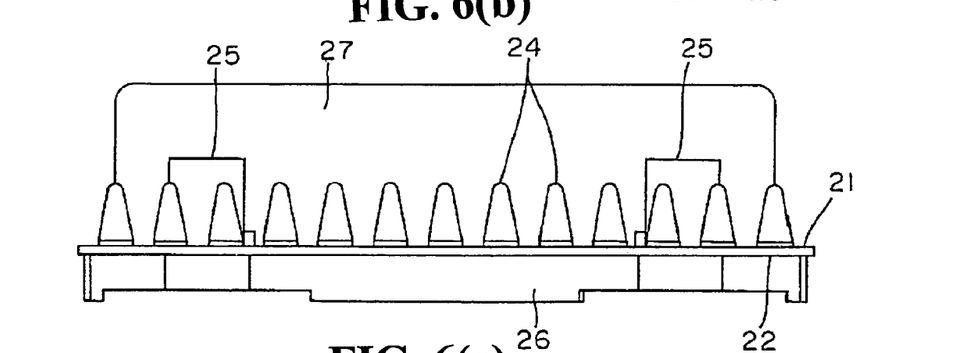
Figure 6C:
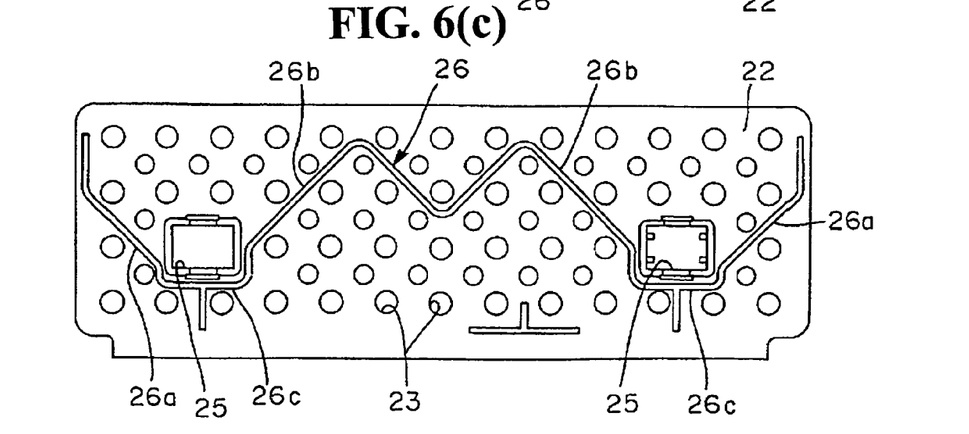
Figure 7A:
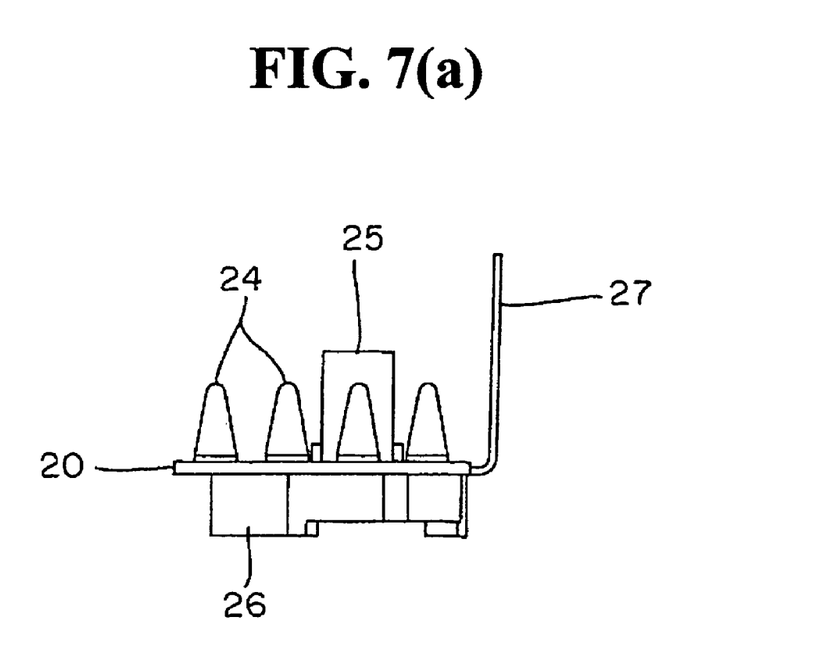
FIG. 7(a) is a right side view.
Figure 7B:
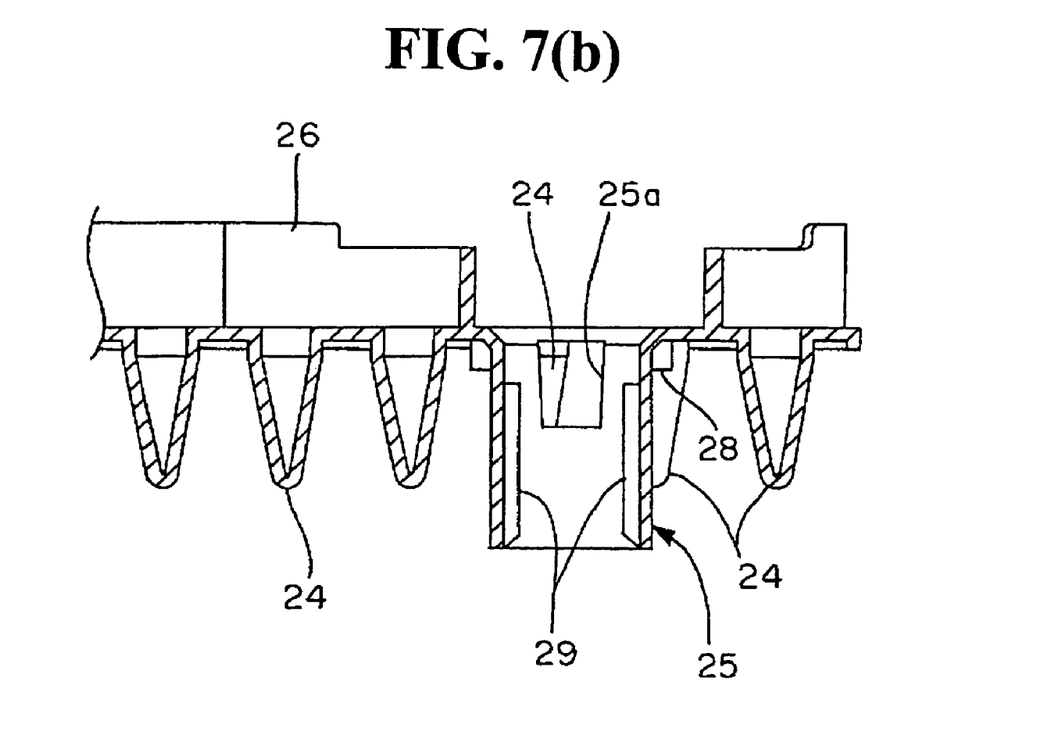
FIG. 7(b) is an enlarged cross section of the right side section along line 7(b)-7(b) in FIG. 6(a).
Figure 8A:
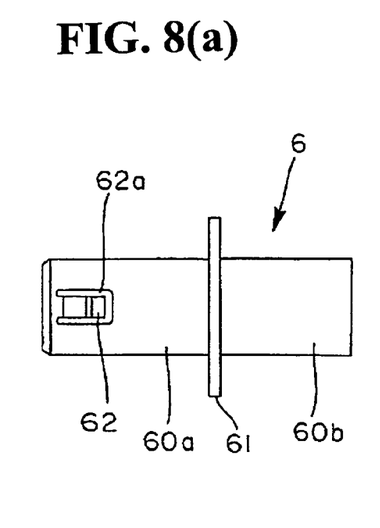
FIGS. 8(a)-8(d) are front view, right end view, and cross sections at lines 8(c)-8(c) and 8(d)-8(d) in FIG. 8(b), respectively, of a connector.
Figure 8B:
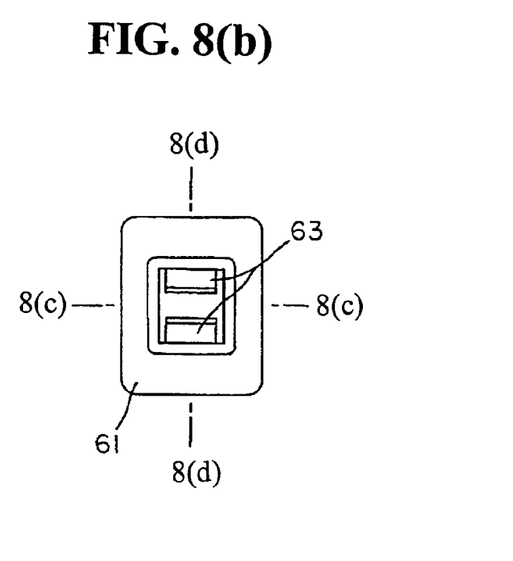
Figure 8C:
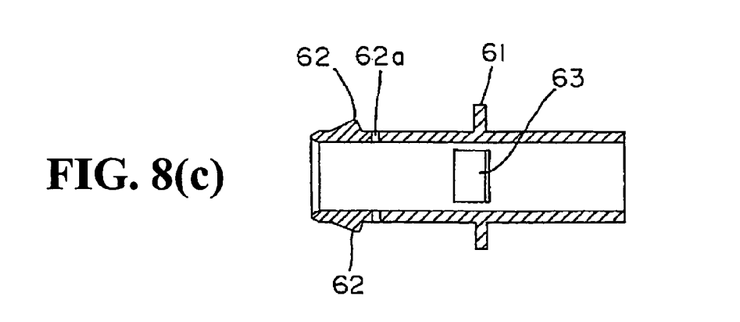
Figure 8D:
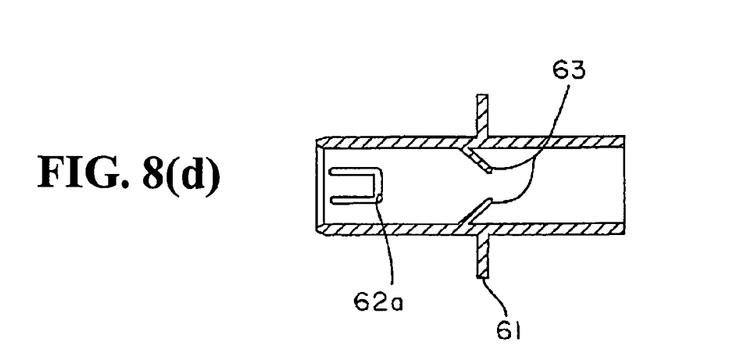

The through holes 23 are disposed at substantially regular intervals from front to back and from side to side, and are substantially the same in shape. In other words, the through holes 23 are small circular holes, but the holes may take other shapes. The projections 24 are disposed at substantially regular intervals from front to back and from side to side so as to surround one through hole 23 with four projections 24 except for the areas where two tubular parts 25 are located. The projections 24 are conical in shape with the inside hollowed out; they may take another shape as long as the size tapers from the base to the tip. The height of the projections 24 is determined by the number of plates used, excluding the innermost plate 2, and the spacing provided between the plates.

The tubular parts 25 are formed in the right and left sections of the upper surface 21, penetrable at the upper and lower ends, and have cross sections that are substantially rectangular in shape. Each of the tubular parts 25 is formed higher than the projections 24, and provided with locking holes 25a, which extend through the front and rear walls of the rectangular tube so as to oppose one another near the base, and a pair of restraining ribs 28, which project from the outer surface of the respective left and right side walls of the rectangular tube. The tubular part 25 on the right side is provided with a pair of restraining ribs 29 to project on the inner surface of the respective left and right side walls of the rectangular tube so as to oppose one another. The locking holes 25a are formed as substantially rectangular holes to lock the later described flexible tabs 62 of the connector 6. The restraining ribs 28 are projections provided for maintaining the spacing between the upper surface 21 and the plate 3 disposed thereon. The restraining ribs 29 are provided to guide the connector 6. In the tubular part 25 on the left side, the retaining ribs 29 are omitted in order to allow for the positioning of the connector 6 to be inserted into the tubular part 25 against the stud 7 of the installation wall 13.

As shown in FIG. 6(c), the guide ribs 26 are formed to accommodate the inlet sections of the tubular parts 25 and are constructed in such a way that each of the inlets of the tubular parts 25 is provided with a pair of guide ribs 26a and 26b, which are disposed at both sides of the inlet and spread apart as they become further distant from the inlet (V-shaped), in combination with a locking rib 26c, which is disposed on one outer side of the inlet to connect the ends of the guide ribs 26a and 26b where they approach one another. The upright wall 27 is abutted against the corresponding section of the tank's installation wall 13 when the noise suppressing device 1 is installed so as to prevent the device from rattling when subjected to a shock; the upright wall is omitted in some cases.

The plate 3, as shown in FIGS. 2 and 5(a) and 5(b), is rectangular in shape and substantially the same in size as the innermost plate 2, and the upper and lower surfaces 31 and 32 of the plate 30 are shaped in the same way. The plate 3 has a plurality of through holes 33 and 34 that extend through the upper and lower surfaces, frames 35 disposed on the left and right sides through which the tubular parts 25 are inserted, and restraining ribs 36 that border the upper and lower edges of the respective frames 35.

The through holes 33 are circular holes having the same diameter as that of the through holes 23 of the innermost plate 2 that are similarly disposed at substantially regular intervals from side to side and from front to back. However, the through holes 33 are set so that the center is slightly shifted from the center of the through holes 23 when the plate 3 is stacked on the innermost plate 2. The through holes 34 are circular holes large enough to allow for the projections 24 of the innermost plate 2 to be inserted therethrough with play, and are disposed at substantially regular intervals from side to side and from front to back as in the case of the projections 24. In other words, the projections 24 plays in the corresponding through holes 34 when the plate 3 is stacked on the innermost plate 2. The frames 35 are rectangular holes, which correspond to the tubular parts 25, bordered with the restraining ribs 36 disposed so as to project from the upper and lower surfaces. The restraining ribs 36 maintain the spacing between plate 2 and plate 3 (and between plates 3 and 4, and between plates 4 and 5) at a predetermined distance when the plate 3 (4 and 5) is stacked on the innermost plate 2 with the tubular parts 25 inserted through the corresponding frames 35.

As shown in FIGS. 8(a)-8(d), the connector 6 is substantially tubular rectangular in shape, and has an insert portion 60a, which can be inserted into the tubular part 25, a handle portion 60b, which is connected to the insert portion 60a and will be disposed outside of the tubular part 25, a rectangular flange 61, which is projected from the outer periphery so as to partition the insert portion 60a from the handle portion 60b, flexible tabs 62 disposed on two opposing walls that define the insert portion 60a, and engaging pieces 63 disposed on the inner surfaces of the other opposing walls, having no flexible tabs 62, that define the insert portion 60a.

As is inferred from FIG. 2, the insert portion 60a having a rectangular frame-shaped cross section is given the dimensions so that the sides having the flexible tabs 62 can be inserted into the tubular part 25 without any gap; the sides having the engaging pieces 63 can be inserted without any gap when the restraining ribs 29 are provided, and with a small gap when the restraining ribs 29 are not provided. The gap allows for the slight movement of the connector 6 thereby enabling the adjustment of its position relative to the corresponding stud 7, while maintaining the engagements between the flexible tabs 62 and the locking holes 25a, even if the spacing between the studs 7 is slightly off the design value.

The handle 60b is the section where the connector 6 is held manually or by using a robotic hand, and, at the same time, is the tubular section that covers the tip of the stud 7. The flange 61 abuts against the end surface of the tubular part 25 when the insert section 60a is inserted into the tubular part 25 and the flexible tabs 62 engage with the locking holes 25a, and, at the same time, functions as a retainer to prevent the plates 3-5, which are stacked together via the tubular part 25, from slipping off. Such a flange 61 may also be provided with a locking hole to engage with a projection formed on the restraining rib 36 or the like of the outermost positioned plate 5 so that the connector 6 is even more stably fastened via the engagement between the projection and the locking hole. Each flexible tab 62 is defined by a substantially U-shaped slit 62a created in the lower section of the insert section 60a; it is resiliently displaced inwardly when inserted into the tubular part 25, and, upon reaching the locking hole 25a, regains its initial state to engage with the locking hole 25a.

Each engaging piece 63 is formed to slant upwardly to allow, with resilient displacement, the passage of some of the flexible locking wings 17 of a stud stem 16, which are located towards the tip thereof and beyond the engaging piece 63, when inserted into a connector 6, while engaging at the neck between two locking wings after the locking wing at a target height passes the engaging piece, as shown in FIG. 2.

Operation

The plates 3-5 described above are assembled as the noise suppressing device 1 upon stacking them on the innermost plate (first plate) 2 via the fitting of the tubular parts 25 with the frames 35, followed by the insertion of the connectors 6 into the tubular parts 25 and the engagement between the flexible tabs 62 and the locking holes 25a. In the assembled state, as shown in FIG. 2, the spacing between the plate 2 and the plate 3 is the distance set by the restraining ribs 28 and the restraining ribs 36, while the spacing between the plates 3 and 4 and the spacing between plates 4 and 5 are the distances set in proportion to the ribs 36 and the ribs 36, respectively.

The projections 24 on the plate 2 are inserted into the through holes 34 of the plate 3 and the through holes 34 of the plate 4 in that order. In this construction, therefore, each of the plates 3-5 is maintained at the predetermined intervals, and, at the same time, the substantial hole areas of the plates 3-5 are varied by sequentially inserting the substantially conical projections 24 into the through holes 34 of the plate 3 and the through holes 34 of the plate 4. In this case, the further distanced the plate is from the tank's installation wall 13, the larger the substantial areas of the through holes 34 become. Moreover, the positions of the through holes 23 of the innermost plate 2 are shifted from the through holes 33 of the outermost plate 5. These have been employed upon testing and determined to be preferable in terms of efficiently dispersing or dampening the noise, i.e., the energy of the wave action, associated with the movement of fuel in the tank 10.

The noise suppressing device 1 described above is securely attached to the studs 7 disposed on the tank's installation wall 13 by engaging the engaging pieces 63 of the connectors 6 with the studs' locking wings 17 located at a desired height. During the installation operation, the guide ribs 26 align the inlets of the tubular parts 25 with the studs 7, and allow for one-touch positioning thereof when the noise suppressing device 1 is moved towards the studs 7 to insert the studs 7 into the tubular parts 25 (and the connectors 6 inserted within the tubular parts) from the lower surface side of the plate 2 in the case of attaching the noise suppressing device 1 to the studs 7 of the tank's installation wall 13 manually or automatically via a robotic hand.

First Variation

FIGS. 9(a) and 9(b) and 10 show, in correspondence with FIGS. 1(a) and 1(b) and 2, a simplified version of the noise suppressing device described above. The fuel tank 10 in FIG. 9(a) has a noise suppressing device 1A of the first variation attached to the installation wall 13 of the inner surface of the tank. In the first variation, a pair of studs 7 is disposed on the installation wall 13 for attaching the noise suppressing device 1A thereto. Each of the studs 7 integrally forms a head 15 securely attached to the installation wall 13 by welding or the like, a stem 16 projecting on the head 15 and inserted from the through hole 14 of the installation wall 13, and a plurality of flexible locking wings 17 disposed axially along the stem 16 at substantially regular intervals.

FIG. 9(b) is a front view of the noise suppressing device 1A in FIG. 9(a), and FIG. 10 is a cross section thereof. The noise suppressing device 1A is constructed with a plate 2, which constitutes the main plate body, and is the innermost plate (first plate) 2 described above, and a means for installing the plate 2 to the installation wall 13 of the fuel tank 10, such as the connectors 6. In other words, the plate 2, or the main plate body, as previously described, integrally forms a plurality of through holes 23 that extend through the upper and lower surfaces 21 and 22 of the plate 20, numerous projections 24 and two tubular parts 25 disposed on the upper surface 21 of the plate 20, guide ribs 26 disposed so as to project from the lower surface 22 of the plate 20, and an upright wall 27 disposed so as to stand forward from the front or rear edge of the plate 20.

The plate 2, or the main plate body, described above is assembled as the noise suppressing device 1A by inserting the connectors 6 or the installing means into the tubular parts 25 and engaging the flexible tabs 62 with the locking holes 25a. The noise suppressing device 1A is securely attached to the studs 7 disposed on the tank's installation wall 13 by engaging the engaging pieces 63 of the connectors 6 with the studs' locking wings 17 located at a desired height. In this case, when attaching the noise suppressing device 1A to the studs 7 of the tank's installation wall 13 manually or automatically via a robotic hand, the guide ribs 26 align the inlets of the tubular parts 25 with the studs 7, allowing for a one-touch positioning upon moving the noise suppressing device 1A towards the studs 7 for insertion into the tubular parts 25 (and the connectors 6 inserted within the tubular parts) from the lower surface side of the plate. These are exactly the same as those described in relation to the first embodiment of the noise suppressing device 1 described above.

Second Variation

FIGS. 11(a)-11(c) show the second variation of the noise suppressing device shown in FIGS. 1-8 per plate. In the second variation, the plate construction comprises a total of three plates: the innermost plate 2A shown in FIG. 11(a), which corresponds to the innermost plate 2 of the aforementioned embodiment, and plates 3A and 4A shown in FIGS. 11(b) and 11(c), which correspond to plates 3 and 4 of the aforementioned embodiment. On the innermost plate 2A, the projections 24 and the upright wall 27 of the previous embodiment are omitted. The innermost plate 2A integrally forms a plurality of through holes 23 that extend through the upper and lower surfaces of the plate 20, two tubular parts 25 disposed on the upper surface of the plate 20, and guide ribs (not shown) disposed on the lower surface (the surface that opposes the installation wall 13) of the plate 20. The plates 3A and 4A are the same in the following respects: they are rectangular in shape and substantially the same as the innermost plate 2A in size; the upper and lower surfaces of the plate 30 are shaped the same; and have frames 35, which are disposed on the left and right sides and insertable into the tubular parts 25, and restraining ribs 36 that border the frames 35.

They differ, however, as follows: the plate 3A is to be disposed between the innermost plate 2A and the plate 4A, and provided only with a plurality of through holes 34 that are larger than the through holes 23, whereas the plate 4A is to be disposed at the furthest position from the tank's installation wall 13 and provided with a plurality of through holes 33 and through holes 34.

Although drawings are omitted, the plates 3A and 4A described above are assembled as the noise suppressing device 1 in the same manner as in the previous embodiment; they are stacked together on the innermost plate 2A via the fitting of the tubular parts 25 with the frames 35, followed by the insertion of the connectors 6 into the tubular parts 25 and the engagement between the flexible tabs 62 and the locking holes 25a.

Many modifications and variations of the present invention are possible, excluding those of the requirements as described above. Naturally, for the main plate body of the noise suppressing device 1A of the first variation described above, the innermost plate 2A of the second variation may do as well. Moreover, the fuel tank 10 may be provided with a bracket or the like disposed therein to serve as an installation wall in some cases, instead of setting up a given wall section of the tank as installation wall 13.

In the above embodiments, a fuel tank has been used as a container. The present invention, however, is not limited to that, and may be applied to various types of liquid containers. In the above embodiments, the projections have been given a conical shape, but they may also have a conical shape without a tip, or a shape having a curved peripheral wall. The through holes described above have been formed in the flat areas of the plates, but may also be formed, for example, in the hollowed projections. In this case, forming these through holes or small holes at the tips of the hollow projections would prevent a liquid, such as fuel, from collecting therein even when the projections are disposed with their tips facing down.

The disclosures of Japanese Patent Application Nos. 2005-123441 filed on Apr. 21, 2005, and 2005-361315 filed on Dec. 15, 2005, are incorporated herein.

While the invention has been explained with reference to the specific embodiments of the invention, the explanation is illustrative, and the invention is limited only by the appended claims.

What is claimed is:

1. A noise suppressing device attachable to a wall within a liquid container for lessening and absorbing noise generated by a liquid as it moves within the container, the noise suppressing device comprising:
a main plate body comprising an upper plate surface and a lower plate surface, a plurality of through holes extending through the upper and lower plate surfaces for permitting flow of the liquid from one side of the main plate body to another side of the main plate body, and a plurality of projections formed on the main plate body, each projection having a base and a tip, and being tapered from the base to the tip, and
an attachment device for attaching the main plate body to the container wall,
wherein said plurality of projections projects away from one of the upper and lower plate surfaces and is spaced apart from each other with a predetermined interval therebetween on a main area of the main plate body, and said plurality of through holes is spaced apart from each other with a predetermined interval therebetween on the main area.

2. The noise suppressing device according to claim 1, wherein the through holes are respectively disposed between the projections.

3. The noise suppressing device according to claim 2, wherein the projections are formed on the main plate body to be generally equally spaced apart from each other.

4. The noise suppressing device according to claim 3, wherein the main plate body further comprises a guide rib at a side opposite to a side that the projections are formed.

5. The noise suppressing device according to claim 1, wherein each of the projections has a conical shape and the projections are arranged in a regular interval.

6. The noise suppressing device according to claim 5, wherein the projections are arranged such that one through hole is surrounded by four projections.

7. A noise suppressing device attachable within a liquid container for lessening and absorbing noise generated by a liquid as it moves within the container, the noise suppressing device comprising:
a plurality of plates stacked at intervals with an empty space therebetween, each plate comprising an upper plate surface and a lower plate surface, and a plurality of through holes extending through the upper and lower plate surfaces for permitting flow of the liquid from one side of each of the plates to another side of each of the plates, said plurality of through holes being formed in a main area of each of the plates and spaced apart from each other with a predetermined interval therebetween,
wherein the through holes of each plate define a plate hole area for allowing the liquid to pass through, and the through holes of each plate are arranged so that the plate hole area varies from one plate to an adjacent plate.

8. A noise suppressing device attachable within a liquid container for lessening and absorbing noise generated by a liquid as it moves within the container, the noise suppressing device comprising:
a plurality of plates stacked at intervals with an empty space therebetween, each plate comprising an upper plate surface and a lower plate surface, and a plurality of through holes extending through the upper and lower plate surfaces for permitting flow of the liquid from one side of each of the plates to another side of each of the plates, said plurality of through holes being formed in a main area of each of the plates and spaced apart from each other with a predetermined interval therebetween,
wherein the through holes of each plate are arranged so that the plate hole area increases as a distance from a first plate increases.

9. A noise suppressing device attachable within a liquid container for lessening and absorbing noise generated by a liquid as it moves within the container, the noise suppressing device comprising:
a plurality of plates stacked at intervals with an empty space therebetween, each plate comprising an upper plate surface and a lower plate surface, and a plurality of through holes extending through the upper and lower plate surfaces for permitting flow of the liquid from one side of each of the plates to another side of each of the plates, said plurality of through holes being formed in a main area of each of the plates and spaced apart from each other with a predetermined interval therebetween,
wherein a first plate comprises projections formed thereon, each projection having a base and a tip, and being tapered from the base to the tip, and the plate hole area is varied by inserting the projections into the plates other than the first plate.

10. A noise suppressing device attachable within a liquid container for lessening and absorbing noise generated by a liquid as it moves within the container, the noise suppressing device comprising:

a plurality of plates stacked at intervals with an empty space therebetween, each plate comprising an upper plate surface and a lower plate surface, and a plurality of through holes extending through the upper and lower plate surfaces for permitting flow of the liquid from one side of each of the plates to another side of each of the plates, said plurality of through holes being formed in a main area of each of the plates and spaced apart from each other with a predetermined interval therebetween, wherein a hole position of each of the through holes of a first plate is shifted relative to the through holes of a plate most distant from the first plate.

11. A noise suppressing device attachable within a liquid container for lessening and absorbing noise generated by a liquid as it moves within the container, the noise suppressing device comprising:

a plurality of plates stacked at intervals with an empty space therebetween, each plate comprising an upper plate surface and a lower plate surface, and a plurality of through holes extending through the upper and lower plate surfaces for permitting flow of the liquid from one side of each of the plates to another side of each of the plates, said plurality of through holes being formed in a main area of each of the plates and spaced apart from each other with a predetermined interval therebetween, a tubular part disposed on a first plate, and having a locking hole therein, a frame part disposed on the plates other than the first plate for insertably receiving said tubular part, and a substantially tubular connector having a flexible tab therein, the connector capable of being inserted from a top of the tubular part and locked therein via engagement between the tubular part locking hole and the connector flexible tab.

12. A combination comprising a noise suppressing device and an installation structure thereof to an installation wall of a container, said noise suppressing device comprising:

a plurality of plates stacked at intervals, each plate comprising an upper plate surface and a lower plate surface, and through holes extending through the upper and lower plate surfaces for permitting flow of the liquid from one side of each of the plates to another side of each of the plates, a tubular part disposed on a first plate, and having a locking hole therein, a frame part disposed on the plates other than the first plate for insertably receiving said tubular part, and a substantially tubular connector having a flexible tab therein, the connector capable of being inserted from a top of the tubular part and locked therein via engagement between the tubular part locking hole and the connector flexible tab, and said installation structure comprising:

a stud having a stem and a plurality of flexible locking wings axially disposed along the stem at substantially regular intervals, the stud capable of being preinstalled to the installation wall, and an engaging piece disposed to project from within the tubular connector, wherein the device is held in attachment to the installation wall by the stud inserted through the tubular part of the first plate and into the tubular connector, with one of the flexible locking wings engaged with the engaging piece.

13. A combination according to claim 12, wherein the first plate comprises projections formed thereon, and the first plate is arranged so that the projections protrude from one of the plate surfaces not opposing the installation wall.

\* \* \* \* \*